United States Patent
Li et al.

(10) Patent No.: US 7,933,315 B2
(45) Date of Patent: Apr. 26, 2011

(54) SPREAD SPECTRUM COMMUNICATION AND SYNCHRONIZATION

(75) Inventors: Yunchu Li, Andover, MA (US); Gil Engel, Lexington, MA (US); Bernd Schafferer, Wilmington, MA (US)

(73) Assignee: Analog Devices, Inc., Norwood, MA (US)

( * ) Notice: Subject to any disclaimer, the term of this patent is extended or adjusted under 35 U.S.C. 154(b) by 1039 days.

(21) Appl. No.: 11/504,270

(22) Filed: Aug. 15, 2006

(65) Prior Publication Data

US 2008/0043819 A1 Feb. 21, 2008

(51) Int. Cl.
*H04B 1/00* (2006.01)
(52) U.S. Cl. .................. 375/150; 375/347; 375/349
(58) Field of Classification Search .............. 375/130, 375/133, 141, 142, 150, 152, 347, 349
See application file for complete search history.

(56) References Cited

U.S. PATENT DOCUMENTS

| | | | |
|---|---|---|---|
| 4,081,842 A * | 3/1978 | Harbaugh et al. | 358/409 |
| 4,684,981 A * | 8/1987 | Toyoshima et al. | 725/151 |
| 4,888,767 A * | 12/1989 | Furuya et al. | 370/243 |
| 5,349,606 A * | 9/1994 | Lovell et al. | 375/150 |
| 5,559,788 A * | 9/1996 | Zscheile et al. | 370/206 |
| 5,862,172 A * | 1/1999 | Sugita et al. | 375/142 |
| 6,018,547 A * | 1/2000 | Arkhipkin et al. | 375/133 |
| 6,141,372 A * | 10/2000 | Chalmers | 375/147 |
| 6,456,672 B1 * | 9/2002 | Uchiki et al. | 375/344 |
| 2002/0015437 A1 * | 2/2002 | Li et al. | 375/146 |
| 2003/0038771 A1 * | 2/2003 | Sunohara | 345/103 |
| 2006/0176939 A1 * | 8/2006 | Goldberg | 375/148 |
| 2007/0036246 A1 * | 2/2007 | Hammerschmidt | 375/340 |
| 2007/0100473 A1 * | 5/2007 | Shvodian et al. | 700/19 |
| 2008/0037990 A1 * | 2/2008 | Effenberger | 398/67 |

* cited by examiner

*Primary Examiner* — Emmanual Bayard
(74) *Attorney, Agent, or Firm* — Sunstein Kann Murphy & Timbers LLP

(57) ABSTRACT

A method for generating a data signal for synchronizing one or more electrically coupled digital receivers is disclosed. A data signal having a data rate is modulated with a pseudo-noise (PN) code having a data rate greater than the data rate of the data signal. The modulated data signal is demodulated by a receiver using the PN code. A correlation value is generated and is compared to a predetermined value to indicate phase synchronization. If the receiver is in phase synchronization with the transmitter, the received demodulated data signal is passed.

20 Claims, 10 Drawing Sheets

| BARKER CODE | SHIFTED BARKER CODE | XOR RESULT (NOT INVERTED) | CRLTR TOTAL | XOR RESULT (INVERTED) | CRLTR TOTAL |
|---|---|---|---|---|---|
| NO SHIFT | 1 1 1 0 0 1 0 | 1 1 1 0 0 1 0 | 7 | 0 0 0 1 1 0 1 | -7 |
| RIGHT SHIFTED BY 1 | 0 1 1 1 0 0 1 | 1 1 1 1 1 1 1 | -1 | 0 0 0 0 0 0 0 | 1 |
| RIGHT SHIFTED BY 2 | 1 0 1 1 1 0 0 | 0 1 1 0 1 0 0 | -1 | 1 0 0 1 0 1 1 | 1 |
| RIGHT SHIFTED BY 3 | 0 1 0 1 1 1 0 | 1 0 1 0 0 0 1 | -1 | 0 1 0 1 1 1 0 | 1 |
| RIGHT SHIFTED BY 4 | 0 0 1 0 1 1 1 | 0 1 0 0 0 1 1 | -1 | 1 0 1 1 1 0 0 | 1 |
| RIGHT SHIFTED BY 5 | 1 0 0 1 0 1 1 | 0 0 1 1 0 1 0 | -1 | 1 1 0 0 1 0 1 | 1 |
| RIGHT SHIFTED BY 6 | 1 1 0 0 1 0 1 | 1 0 0 0 1 1 0 | -1 | 0 1 1 1 0 0 1 | 1 |

ACCUMULATOR OUTPUT: -1 FOR XOR RESULT = 0; 1 FOR XOR RESULT = 1

FIG. 5

SPREAD SPECTRUM COMMUNICATION AND SYNCHRONIZATION

TECHNICAL FIELD AND BACKGROUND ART

The present invention relates to synchronizing signals between multiple devices and more specifically to synchronizing signals using spread spectrum techniques.

Systems that include multiple electronic devices, such as the centrally controlled multiple digital-to-analog converter (DAC) system as shown in FIG. 1, require data signal synchronization. Generally, these multi-device systems include multiple data outputs OUT 1, OUT 2, OUT 3, that need to operate within tight timing constraints. As a result, the system includes both a clock circuit CLOCK SOURCE and a separate synchronization signal distributor SYNC DIST for synchronizing the clock signal. The synchronization signal distributor SYNC DIST receives a synchronization signal SYNC_O from master DAC 1, and distributes it to all slaves DAC 2, DAC 3, at their synchronization signal inputs SYNC_I. In certain prior art embodiments, a synchronization signal distributor is used because LVDS is a point-to-point bus, and unlike a CMOS bus, it cannot broadcast directly from one output to many inputs. Using this distribution system, the synchronization signal distributor SYNC DIST confirms that all of the DACs are in sync and the data out signals are operating within the timing constraints. However, as clock frequencies increase, generating signals that need to occur simultaneously within several devices becomes more difficult due to sampling noise and jitter affects on signal edges. Due to jitter and sampling noise, the DACs may inaccurately read the synchronization and data signals.

In the prior art system shown in FIG. 1, DACs 1, 2, and 3 are identical because they are the same product. Each DAC includes two state machines. State machine #1 is controlled by SYNC_I, and state machine #2 sends its state variable to SYNC_O if it is enabled. For DAC 1, state machine #1 is the working state machine, but state machine #2 is also enabled. DAC1 is the "master" device only because its state machine #2 is enabled and its SYNC_O is connected to the sync distributor. DACs 2 and 3 are "slave" devices because their state machines #2 are disabled. In total there are four state machines active—one master state machine and three slave state machines. The master state machine is not going to be strictly in sync with the slave state machines because of propagation delays on the path, but the goal is to make sure all slave state machines are in sync with each other.

SUMMARY OF THE INVENTION

The present invention is a system and method for synchronizing a signal between multiple devices that are electrically connected, such as through a wire line connection, and share a common high frequency input clock. The invention is useful in, but is not limited to, the synchronization of digital systems that have different input and output data rates, and include state machines. Such systems include interpolation filters with digital up-conversion, and decimation filters with digital down-conversion. In such systems, a lower frequency clock is derived from a high frequency input clock. Multiple state machines may need to be synchronized by loading the same state variable at the same time instant. Both goals can be achieved by the proposed invention. Once the data signal is phase synchronized, the signal might be used, for example, to communicate state-variable and time base information to allow state machines in a system to synchronize. In an embodiment of the present invention, a master device provides a state-variable signal that is modulated with a pseudo-noise (PN) code. The PN code includes a number of pseudo-random bits that are sampled at a rate greater than that of the state-variable signal. By using a PN code that has a single-peak auto-correlation function, the state-variable signal can be recovered even if there are errors in the signal caused by jitter or sampling noise.

In a preferred embodiment of the invention, a method for generating a data signal for synchronizing electrically coupled digital receivers is disclosed. A data signal, such as packaged state variables which contain a header and the state variables itself, having a data rate, and a pseudo-noise (PN) code having a single-peak auto-correlation function and a data rate greater than the data rate of the data signal, are received by a modulator circuit. The modulator circuit modulates the data signal with the PN code into a combined signal, which is communicated to one or more digital receivers.

The digital receivers demodulate the combined signal using the same PN code used in generating the combined signal, and then compare a correlation value generated from demodulating the data signal to a predetermined value. If the comparison indicates that the receiver is not phase synchronized with the transmitter, an-out-of-synchronization signal is generated. In an out-of-sync condition, the receiver can attempt to recover synchronization by repeatedly shifting the PN code, demodulating the modulated data signal with the shifted PN code, generating a correlation value, and comparing the correlation value with the predetermined value until the comparison indicates synchronization. If all shifted versions of the PN code are used and the comparisons all indicate out-of-synchronization, an error signal is generated. The predetermined values can be defined such that the comparison will indicate synchronization even if there is a transmission error during one or more periods of the PN signal.

BRIEF DESCRIPTION OF THE DRAWINGS

The foregoing features of the invention will be more readily understood by reference to the following detailed description, taken with reference to the accompanying drawings, in which:

FIG. 5 is a chart showing a 7-bit Barker code and the resulting correlator output when the Barker code is correlated with shifted versions of itself, and with the inverted Barker code;

DETAILED DESCRIPTION OF SPECIFIC EMBODIMENTS

The present invention as embodied in the figures and detailed description discloses a system and method for synchronizing multiple state machines that are electrically connected through a wire line connection and share the same clock. Such a system might include multiple variable-data-rate state machines where the input and output data rates are different. A master device provides a data signal, such as a state variable signal, that is modulated with a PN code. The PN code includes a number of pseudo-random bits that are sampled at a rate greater than that of the state variable signal. By using a PN code, such as a Barker code, that has an auto-correlation function having a single peak, such as a delta function, the synchronization signal can be recovered even if there are errors caused by jitter or sampling noise.

Figure 1:
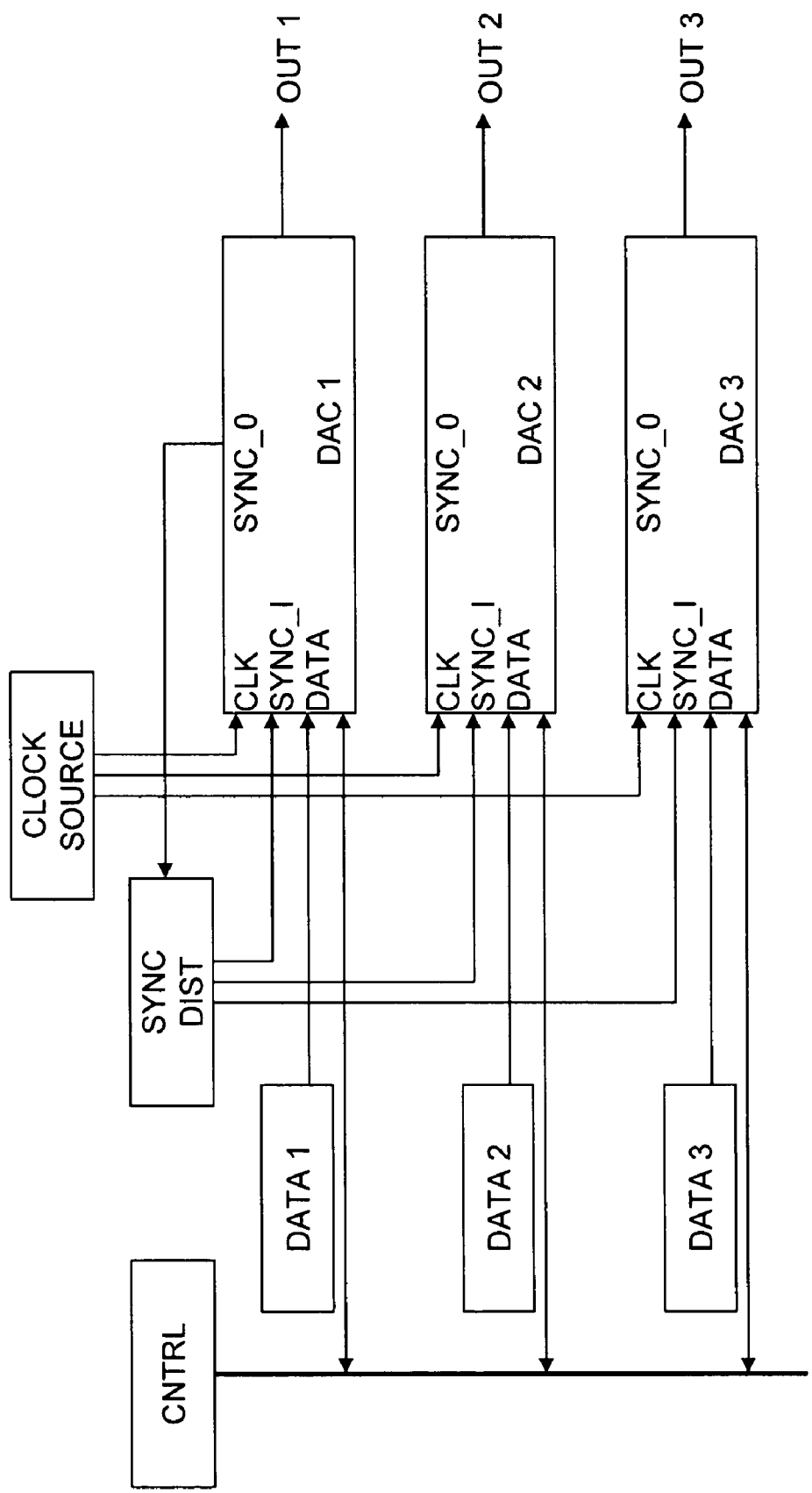
FIG. 1 is a schematic of a prior art system having multiple digital-to-analog converters that are synchronized using a synchronization signal distribution chip and the digital-to-analog converters.
Figure 2:
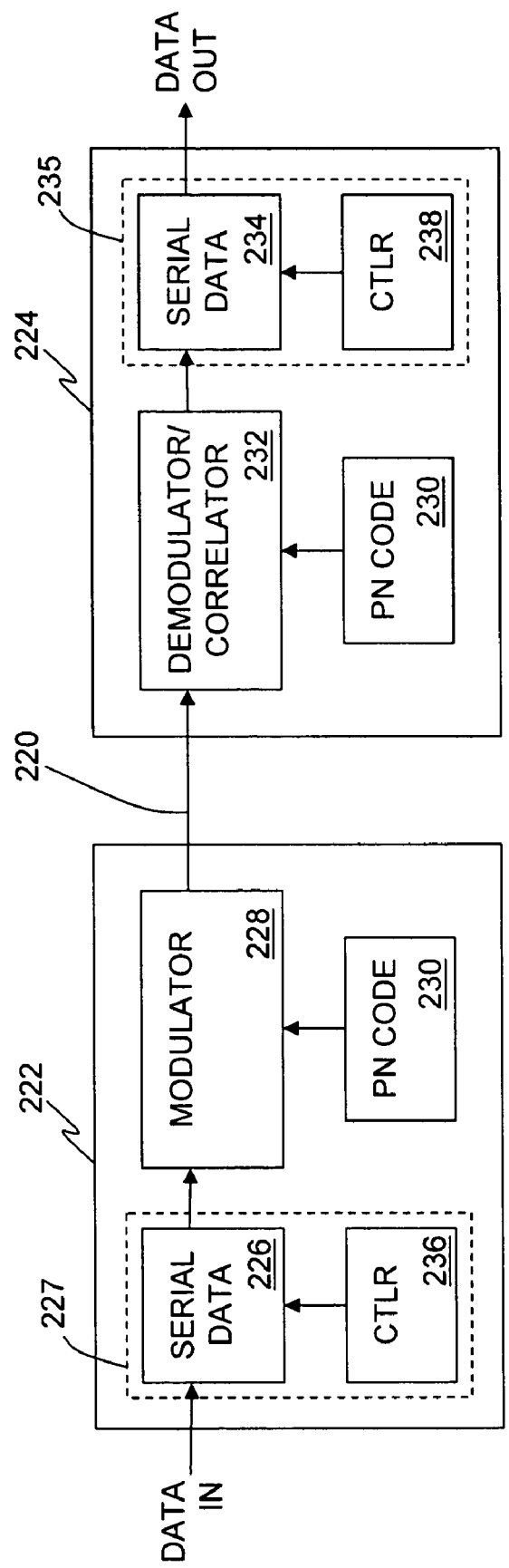
FIG. 2 is a block diagram of an embodiment of the invention that employs digital spread spectrum techniques in order to synchronize multiple devices.

FIG. 2 shows a block diagram of a first embodiment of the invention that employs digital spread spectrum techniques to synchronize multiple devices. Each of the multiple devices includes a state machine for maintaining state information, such as timing information. A state variable signal is sent between a transmitting device 222 and at least one receiving device 224 over wire line connection 220. Transmitting device 222 may be a master DAC and the receiving devices 224 may be slave DACs. In other embodiments, transmitting device 222 may be a centralized clock distributor and the receiving devices are DACs. As shown in FIG. 2, transmitting device 222 includes a parallel-to-serial data module 226 that converts a parallel data signal, such as a state variable signal, into a serial signal with header information. Modulator 228 receives both the serialized state variable signal and a PN code 230. Controller 236 is electrically connected to the system clock and clocks reading and writing of the PN and state variable signal bits in transmitter 222. Serial data module 226 and controller 236 may be integrated together and referred to as encoder 227. PN code 230 may be part of a direct sequence spread spectrum communication. PN code 230 is composed of a number of bits of information defining a known sequence and if transmitted would appear as noise at the receiver. Each bit of PN code 230 is sampled at a rate that is greater than the sampling rate for the state variable signal. Although a direct sequence spread spectrum technique is employed, other spread spectrum techniques may also be employed. PN code 230 and the state variable signal are modulated together, producing a combined signal which is transmitted to receiving device 224 over wire line connection 220. PN code 230 preferably has an auto-correlation function having a single peak, for example at time shift zero, and is close to zero at all other time shifts. Such a function might look like a delta function or an impulse function. An auto-correlation function as described allows for recovery of the data signal even if there are errors within the signal stream due to noise or jitter. Error recovery will be explained further below.

Modulator 228 transmits the combined signal to receiving device 224 over wire line connection 220. A demodulator/correlator module 232 receives and demodulates the combined signal and produces a correlation value by applying the same PN code 230 to the combined signal as was used during the modulation process. Controller 238 is electrically connected to the system clock and clocks reading and writing of the PN and state variable signal bits in receivers 224. The resulting correlation value is provided to a comparator sub-circuit which compares the correlation value of the signal to a threshold value. If the correlation value is within defined threshold values, the data signal is phase synchronized and the data signal is recovered. The recovered state variable signal is provided to a serial-to -parellel data module 234 for distribution to, for example, the state machine associated with receiving device 224. Serial data module 234 and controller 238 may be integrated together and referred to as decoder 235. The state variable signal can be used, for example, to synchronize all state machines associated with receiving devices 224 in the system.

Figure 3A:
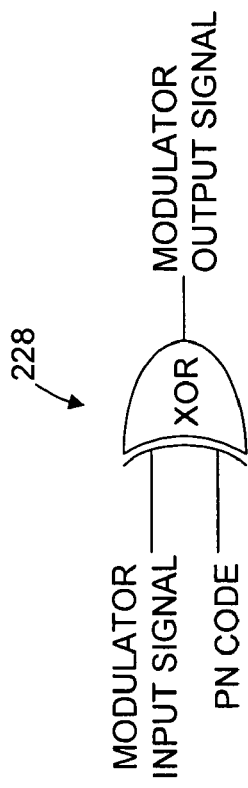
FIG. 3A is a schematic of an embodiment of a modulator.
Figure 3C:
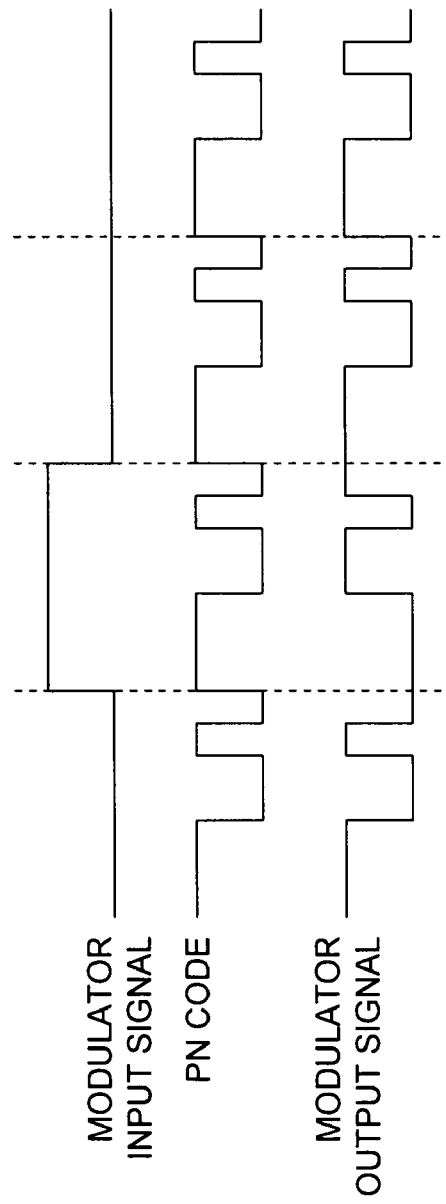
FIG. 3C is a signal timing chart of an embodiment of input and output signals of the modulator.
Figure 3B:
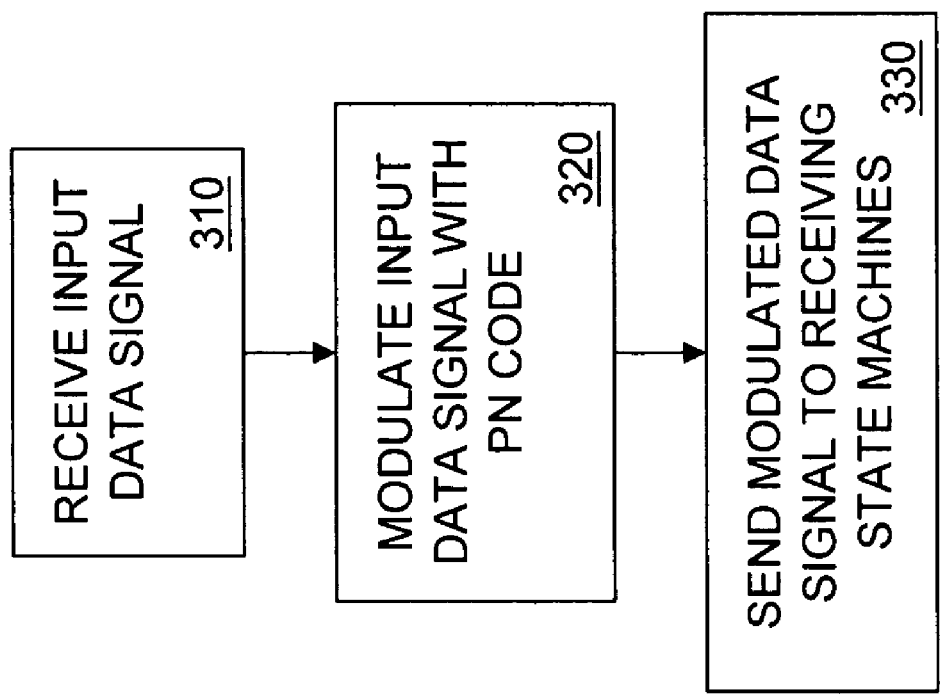
FIG. 3B is a flow chart of an embodiment of the modulation process.

FIG. 3A shows an exemplary embodiment of modulator circuit 228. Modulator circuit 228 includes a plurality of inputs and a single output. As shown in the flow chart of FIG. 3B, at 310 the data signal is received by modulator circuit 228. The inputs of the XOR gate receive the data signal and PN code 230. FIG. 3C shows an example of a data signal at the modulator input signal of modulator circuit 228. The data signal has four data bits—0100. During the period for a data bit, PN code 230 has 7 bits—1110010. PN code 230 is repeated for each of the four data bits. At 320, the data bits from the data signal and the bits from PN code 230 are passed through the XOR gate resulting in the modulator output. If the digital data bit of the data signal is low, the modulator output produces the PN code. If the data bit of the data signal is high, the modulator output produces the inverse of the PN code. At 330, the modulator circuit then sends the modulator output signal to one or more receiving devices 224 that include demodulator circuits 232.

Figure 4A:
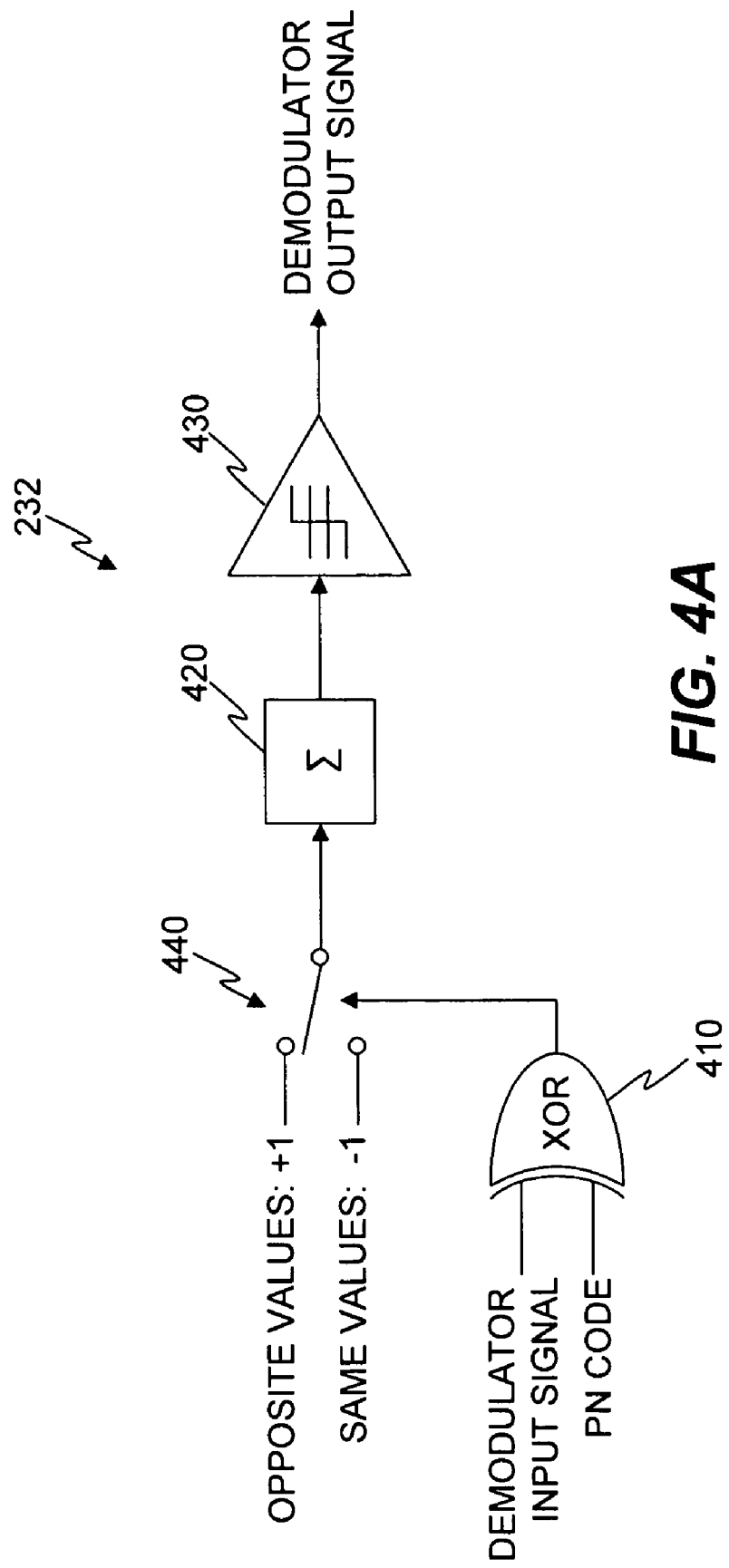
FIG. 4A is a schematic of an embodiment of a demodulator.

FIG. 4A is a circuit schematic of demodulator/correlator circuit 232 in receiving device 224. Demodulator/correlator circuit 232 includes an XOR gate 410 that operates at the data rate of PN code 230. XOR gate 410 is followed by an accumulator 420 which is attached to a comparator 430. XOR gate 410 receives as input the demodulator input signal which is the same as the modulator output signal of FIGS. 3A-3C. XOR gate 410 also receives at its input PN code 230 which is continuously repeated for each data bit of the demodulator input signal. PN code 230 of modulator 228 and demodulator 232 are identical. The output of XOR gate 410, in cooperation with high/low switch 440, produces a value for each bit of PN code 230. XOR gate 410 and high/low switch 440 of the present embodiment produce a value of +1 if the demodulator input signal and the PN bit are opposite values, and produces a value of −1 if the demodulator input signal and the PN bit have the same value. Thus, if the original data signal value is in a low state, a value of −1 should be added to accumulator 420 for each PN bit. If the original data signal value is a high state, a value of +1 should be added to accumulator 420. Over a data value period, accumulator 420 should accumulate a signal that trends toward the high or low value of the original data signal. After the last PN bit of the data period has been processed by accumulator 420, the accumulated value is provided to comparator 430. Circuitry by which accumulator 420 asserts an accumulated value, and by which comparator 430 compares and asserts an output value, after the last PN bit is processed and in accordance with a system clock is known in the art and is not shown in FIG. 4A. If the accumulated value is greater than or less than the threshold values, comparator 430 transmits a demodulator output data signal of 1 or 0, respectively, onto an output bus in accordance with the system clock and controller 238. Generally, XOR gate 410 with high/low switch 440, the threshold values of comparator 430, and the demodulator output data signal of comparator 430 can have any values consistent with the purpose and implementation of the invention.

Figure 4B:
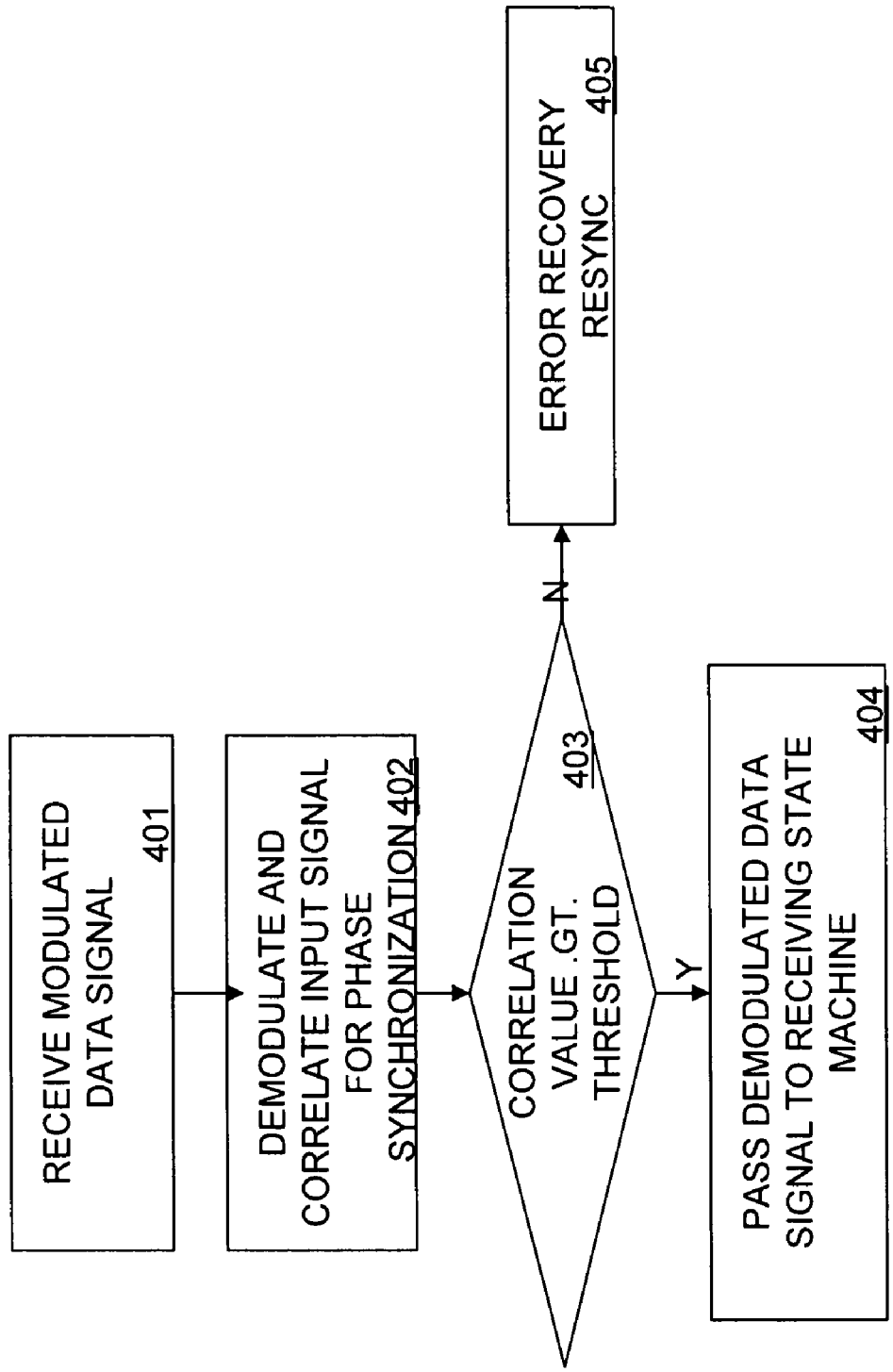
FIG. 4B is a flow chart of an embodiment of the demodulation process.

FIG. 4B shows a flowchart of the demodulation process. At 401, demodulator/correlator circuit 232 receives the modulated state-variable signal and the PN code 230 at XOR gate 410. At 402, local PN code generator 230 is phased aligned with the incoming modulated state-variable signal through correlation. XOR gate 410 in conjunction with high/low switch 440 produces a value of +1 if the demodulator input signal and the PN bit are opposite values, and produces a value of −1 if the demodulator input signal and the PN bit have the same value. The values for each PN bit period are accumulated in accumulator 420 for each demodulator input signal data period. At 403, accumulator 420 transmits the accumulated correlation value to comparator 430 at the end of each demodulator input signal data period. After transmitting the correlation value, accumulator 420 is reset. Comparator 430 compares the correlation value against predefined threshold values. At 404, if the correlation value is above a high threshold value or below a low threshold value, a demodulator output data signal of 1 or 0, respectively, is passed to decoder 235. At 405, an error recovery and resynchronization routine (discussed below) is invoked if the correlation value is not above the high threshold value or below the low threshold value. In this situation, the output data signal of receiver 224 is in an unknown state, which means that either the PN codes 230 on devices 222 and 224 are out of sync with each other, or there were too many errors in the signal.

Figure 4C:
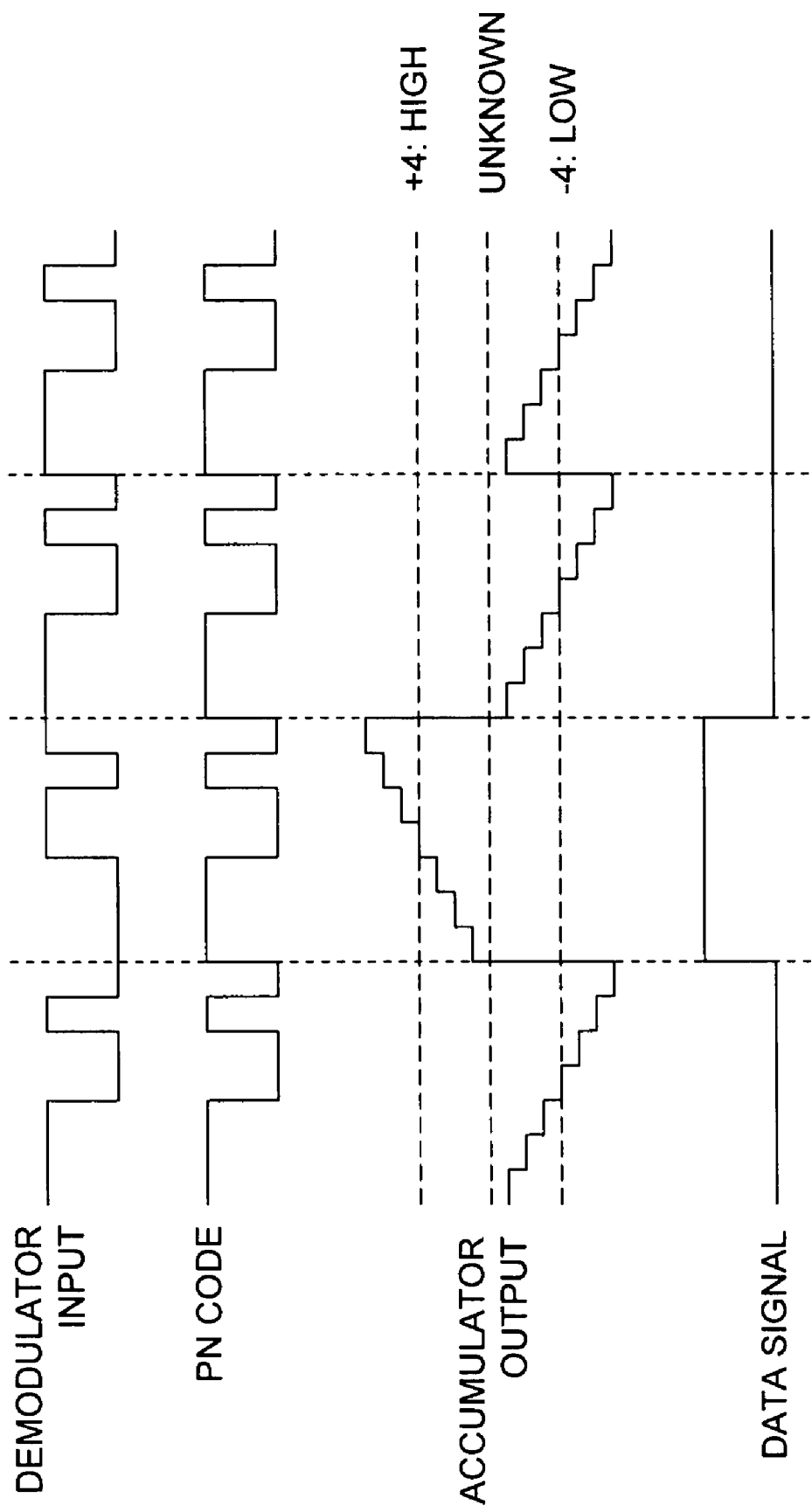
FIG. 4C is a signal timing chart of an embodiment of the input and output signals of the demodulator and the output of the accumulator.

As shown in FIG. 4C, the accumulator 420 output increases and decreases in a stepwise fashion. In the example shown, there are 7 bits in PN code 230 and therefore the accumulator output shows 7 steps. Over the four data value periods, the accumulator tends to a low state, followed by tending toward a high state, and then tending to a low state for each of the last two data value periods. Thus, it appears as if the data signal is 0100. To confirm the values of the data signal, the output of accumulator 420 is provided to comparator 430 after the correlation value has been accumulated for a single data period (7 PN bits in this example). After passing the output of accumulator 420 to comparator 430, accumulator 420 is reset to a zero value. Comparator 430 compares the accumulator 420 correlation value to one or more threshold values. The threshold values determine whether the data value is valid or in an unknown state. For example, the threshold values for a 7 bit PN code may be +/−4. If the accumulator accumulates a correlation value more than +/−4 at the end of the data period, then the output is in a high state and the comparator outputs a high state value. If the correlation value is less than −4, then the output is in a low state and the comparator outputs a low state value. If the accumulator correlation value is between +/−4 inclusive, the data output is in an unknown state. Thus, if there is noise or jitter that causes bit errors wherein the accumulator does not reach either +7 or −7 but is still above or below the threshold values, the system will correctly interpret the data value.

Figure 4D:
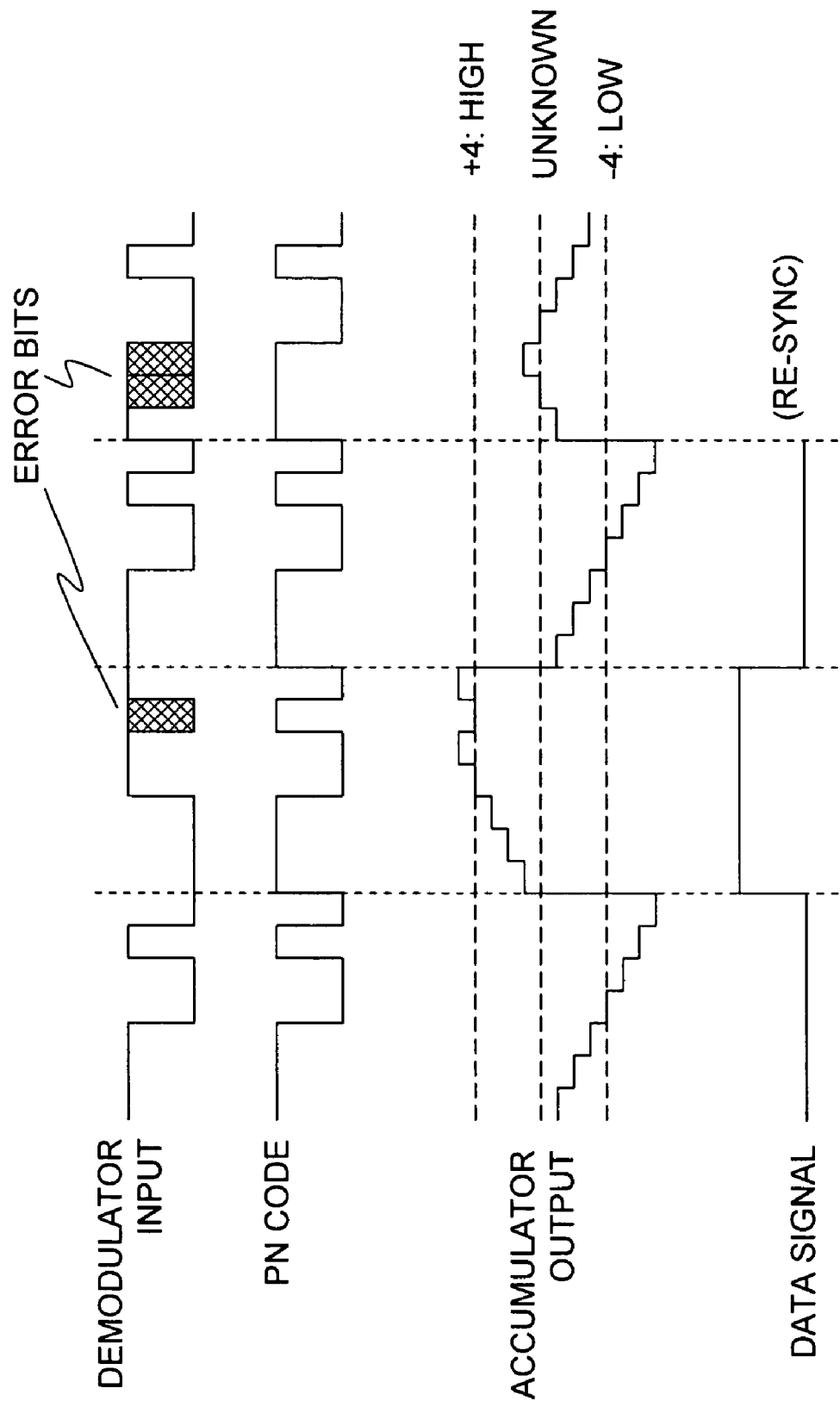
FIG. 4D is a signal timing chart of an embodiment of the input and output signals of the demodulator and the output of the accumulator when error bits are present in the input signal.

FIG. 4D shows an example where the demodulator input signal has one and two bit-errors due to noise or jitter. The threshold values are set to +/−4. The second data period of the demodulator input has a single bit of error during the sixth PN period. This error causes the accumulator correlation value to decrease rather than increase. Even though the error exists, the correlation value at the end of the data period is equal to 5 and is above the threshold value of 4. Therefore, the data signal is in a known state and the comparator will output a data value of +1. The fourth data period of the demodulator input has two bit errors at the second and third PN periods. In this case, the correlation value never crosses the low threshold and therefore the output is in an unknown state and an error routine will be invoked.

It should be understood that the threshold values can be changed to allow for additional bits of error. For example, if the threshold is set to +/−2, two bit errors can occur and the data signal can still be recovered. However, the lower the threshold, the more the system becomes susceptible to errors. For example, as illustrated above, threshold values of +/−4 will allow for a single bit error, and threshold values of +/−2 will allow for a two bit-errors, and the system will still output the correct data value. In the worst cases, though, threshold values of +/−4 will also pass a data value in which all seven PN bits or six of the PN bits are in error. However, the data value passed will be incorrect. Similarly, if the threshold values are reduced to +/−2, a transmitted data value that contains five PN bit errors will also result in an incorrect data value being passed. If the system is not susceptible to noise or jitter errors, then the PN bit errors will typically be related to out-of-sync conditions where demodulator/correlator circuit 232 is comparing a received signal incorporating PN code 230 with a version of the PN code that has been shifted by one or more bits. In these cases, due to inherent properties of the Barker code used for this embodiment of PN code 230, no more than four bit errors can occur, and the output correlation value of accumulator 420 does not exceed +/−1. This is illustrated in FIG. 5 below.

FIG. 5 shows an example of a PN code that has an auto-correlation function having a single peak at zero time shift. As shown, the PN code is 7-bits in length, although other bit lengths and other PN codes can be implemented. This PN code is known to those of ordinary skill in the art as a Barker code. When the Barker code which is present in the modulated signal is XOR'd with itself or its inverse in demodulator 232, the operation results in a peak high or peak low accumulator 420 output, respectively. However, if the Barker code at demodulator 232 is out of sync with the Barker code at modulator 228, the accumulator 420 output results in a correlation value of −1 or 1 which is in the unknown range (assuming threshold values of either −2 and 2 or −4 and 4). As a result, if the accumulator 420 output produces a correlation value in the unknown range, the system will assume that the signal is out of phase synchronization When the accumulator 420 output is in the unknown range (for example between −4 and 4 as shown in FIG. 4D above), the receiving device 224 will attempt to re-synchronize with the transmitting device 222. The receiving device can shift the PN code one bit at a time until the correlator output results in a valid correlation value above or below the thresholds. Each time the PN code is shifted and the correlator output is in the unknown range, the output is out of phase sync. For example, returning to FIG. 5, each time the Barker code is shifted by 1 bit, the correlator output results in a value of 1 or −1 which is in the unknown range. Once a valid correlation value is obtained, the receiving device will use this PN code and will be in phase sync with the transmitting device and any other devices within the system that have received the modulated input signal from transmitting device 222. If after shifting the PN code by the entire PN length, the correlator output does not result in a valid data value, the receiving device can output that a data error has occurred. The error is not a synchronization error since all possible PN codes have been tried and is therefore either a jitter or noise error that is beyond the digital spread spectrum technique's capabilities for recovery.

If the above methodology is employed, the receiving device can recover from some jitter or noise errors without producing a false state-variable signal and additionally, the receiving device can confirm that it is in phase sync with the transmitting device because the accumulator output is greater than or less than the threshold values.

Figure 6:
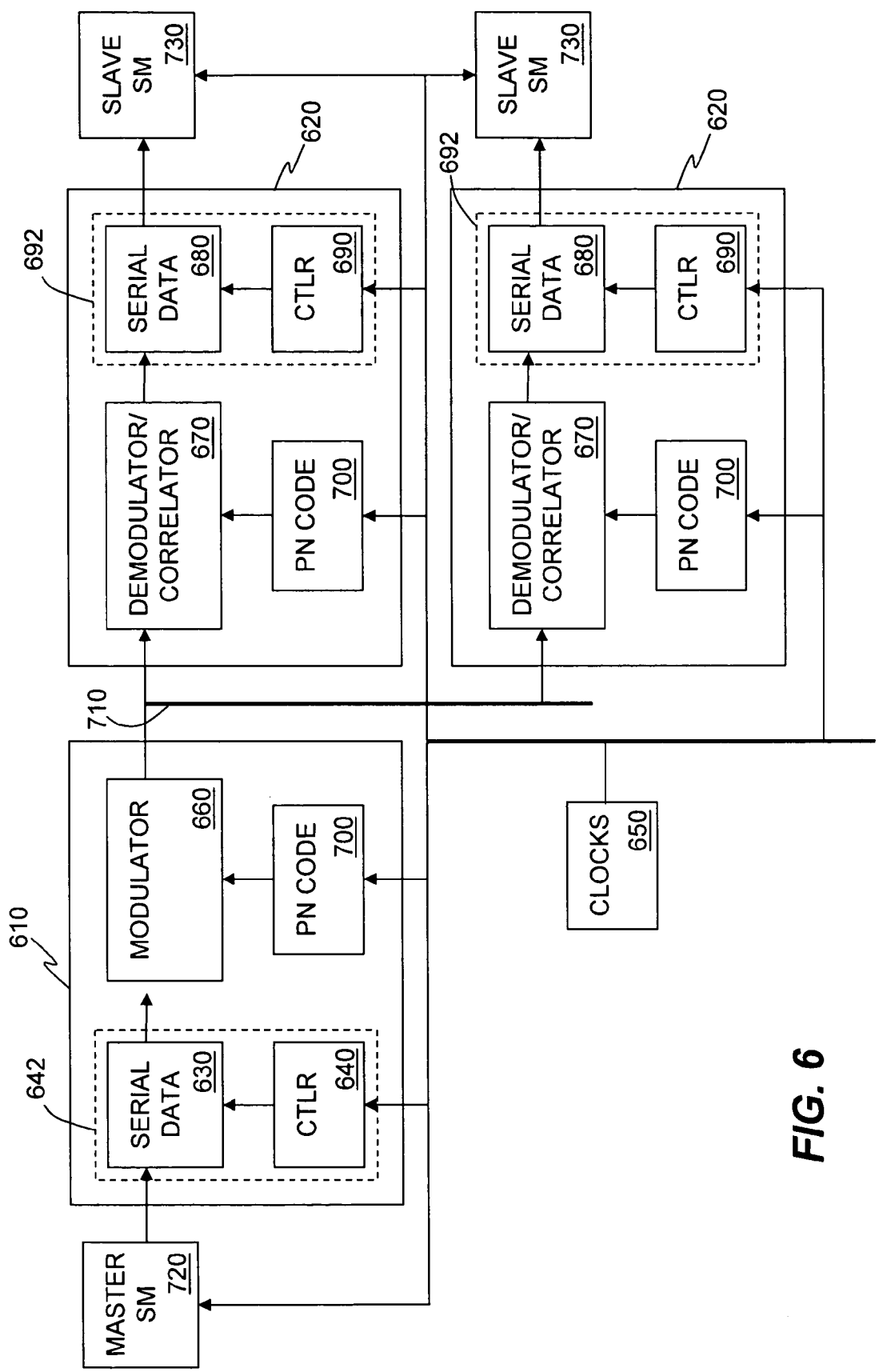
FIG. 6 is a block diagram of an embodiment of the invention showing the functional relationship between the modulator and the demodulators of a multiple DAC system.

FIG. 6 shows an implementation of the present invention wherein a master device 610 modulates and communicates a combined signal to a plurality of receiving devices 620 over a wire line or bus 710. The modulated signal contains a data signal and the receiving devices 620 can confirm synchronization of the data signal and if unsynchronized, the devices can attempt to re-synchronize.

The system works in the following manner. A data signal is provided to a master transmitter 610. The data signal can simply be a synchronization signal or may include additional information. For example, the data signal may be a parallel state-variable signal from master state-machine 720 which contains all information needed to synchronize multiple digital devices such as slave state machines 730. Master transmitter 610 serializes the input data in a parallel-to-serial data module 630 and temporarily stores the data in a series of registers. Master transmitter 610 includes a controller 640 that receives the clock signal 650 for the system and sends a signal to the serial data module 630 that provides a data bit to the modulator 660 at some ratio of the clock signal. Serial data module 620 and controller 640 may be integrated together and referred to as encoder 642. The data bit is modulated with a PN code 700 that is sampled at a rate that is greater than the clock rate for the data bits. Thus, there are a number of PN code bits for each data bit. The modulated signal is output and transmitted over a bus 710 to a plurality of receiving devices 620. For a CMOS system, 710 is simply an output connected to multiple inputs. However, for LVDS system, a splitter or distributor is needed. The receiving devices each include a demodulator and correlator 670. The demodulator and correlator 670 may comprise circuitry as shown above with respect to FIG. 4A or may have other demodulation and correlation circuitry as is known to those of ordinary skill in the art. The demodulator/correlator applies the same PN code 700 as is used on the receiving side of the system. The PN code is applied to each data bit and the output of the demodulator is accumulated for a data bit period. The accumulated correlation value is compared to a predetermined threshold. The correlator may comprise a number different thresholds. If the correlation value is within a predetermined range above or below the threshold, the correlator outputs a corresponding data bit to serial-to-parallel data module 680. If the correlation value is not within the desired range, a receiver 620 can attempt to re-synchronize by shifting PN bits and checking to see if a valid output results. In certain embodiments there could be a plurality of demodulator/correlators in a receiver 620 that provide for each shifted PN sequence, and the correlator output that results in a valid data bit is used.

The data bits are provided to a serial-to-parallel data module 680 that includes memory for storing the data bits. Serial-to-parallel data module 680 is provided with a control signal from a controller 690 which causes each bit to be clocked into memory, and transferred from the serial data module to a data output. Serial data module 680 and controller 690 may be integrated together and referred to as encoder 692. The data may then be processed in any number of ways. For example, the data bits may provide state information, such as state machine synchronization data, to a slave state-machine 730 associated with receiving device 620.

The present methodology is especially beneficial in systems that require synchronized data transmissions at high speeds wherein the sampling rate is so fast that jitter and sampling noise can effect the data signal on a wire line.

Although various exemplary embodiments of the invention have been disclosed, it should be apparent to those skilled in the art that various changes and modifications can be made which will achieve some of the advantages of the invention without departing from the true scope of the invention. For example, while the present embodiment discloses using a 7-bit Barker code, other PN codes can be used. These other codes might include, but are not limited to, other Barker codes, Walsh-Hadamard codes, m-sequences, Gold-codes and Kasami-codes. While the present embodiment describes a system where the transmitting and receiving devices are state machines having integrated demodulation-modulation-correlation components, the modulation and correlation components associated with phase synchronization can be discrete from the digital components that process the phase synchronized data signal. These and other obvious modifications are intended to be covered by the appended claims.

What is claimed is:

1. A method for determining temporal synchronization of a plurality of electrically-coupled digital receivers, the method comprising:
receiving at an input of a single modulator circuit a data signal having a data rate;
modulating the data signal with a pseudo-noise code wherein the pseudo-noise code has a data rate that is greater than the data rate of the data signal;
communicating the modulated signal from the single modulator circuit to the plurality of digital receivers through a wireline connection;
receiving at the plurality of digital receivers the modulated data signal;
for each digital receiver:
generating a correlation values using the modulated data signal and the pseudo-noise code; and
comparing the correlation values to a predetermined value to determine if the data signal is temporally synchronized.

2. The method of claim 1, wherein the pseudo-noise code when auto-correlated has a maximum peak at a single time shift.

3. The method of claim 1, further comprising:
passing the correlation values which represent the demodulated data signal if comparing indicates temporal synchronization.

4. The method of claim 1, further comprising sending an out-of-synchronization signal if comparing indicates out-of-synchronization.

5. The method of claim 1, further comprising:
if comparing indicates out-of-synchronization, repeatedly shifting the pseudo-noise code, demodulating the modulated data signal with the shifted pseudo-noise code, generating a correlation value of the data signal, and comparing the correlation value to the predetermined value until the comparison indicates synchronization.

6. The method of claim 1, wherein the predetermined value is such that comparing indicates synchronization when a predetermined number of bit errors occur during a predetermined interval in the modulated data signal.

7. The method of claim 5, wherein if the pseudo-noise code has been shifted through all bits of the code and no comparison indicates synchronization, sending a data error signal.

8. A system for temporally synchronizing data signals between electrically coupled digital systems, comprising:
a transmitter including an input for receiving a digital data signal having a data rate, a modulator for modulating the digital data signal with a pseudo-noise code having a data rate greater than the digital data signal, and an output for communicating the modulated digital data signal; and a plurality of receivers electrically coupled through a wireline connection to the transmitter, each receiver having an input for receiving the modulated digital data signal, a demodulator for generating at least one correlation value using the pseudo-nouse code and the modulated digital data signal, a comparator for comparing the al least one correlation value to a predetermined value to determine temporal synchronization, and an output for passing the the at least one correlation value that represents the demodulated digital data signal.

9. The system of claim 8, wherein the pseudo-noise code has an auto-correlation function having a maximum peak at one time shift.

10. The system of claim 8, operated to pass the correlation value that represents the demodulated digital data signal if comparing the correlation value to the predetermined value indicates synchronization.

11. The system of claim 8, operated to send an out-of-synchronization signal if comparing the correlation value to the predetermined value indicates out-of -synchronization.

12. The system of claim 8, wherein the predetermined value is such that comparing the correlation value to the predetermined value indicates synchronization when a predetermined number of bit errors occur during a predetermined interval in the modulated data signal.

13. The system of claim 8, further operated such that if comparing the correlation value to the predetermined value indicates out-of-synchronization, repeatedly shifting the pseudo-noise code, demodulating the modulated data signal with the shifted pseudo-noise code, generating a correlation value of the data signal, and comparing the correlation value to the threshold value until the comparison indicates synchronization.

14. A method for determining if a data signal is temporally synchronized, the method comprising:

at a plurality of receivers in a wireline system:

receiving a data signal modulated with a pseudo-noise code and having a data rate from a modulator within the wireline system;

generating a correlation signal using the modulated data signal and the pseudo-noise code; and comparing the correlation signal to a predetermined value for determining if the demodulated data signal is temporally synchronized.

15. The method according to claim 14 wherein the pseudo-noise code has a data rate that is greater than the data rate of the received data signal.

16. The method according to claim 14, wherein the predetermined value is such that comparing will determine that the correlation value that is representative of the demodulated data signal is synchronized even if there is a transmission error during one period of the pseudo-noise code.

17. The method according to claim 14, wherein the predetermined value is such that comparing will determine that the demodulated data signal is synchronized even if there is a transmission error during multiple periods of the pseudo-noise code.

18. The method according to claim 14 wherein if comparing determines that the demodulated data signal is not synchronized, repeatedly shifting the pseudo-noise code, demodulating the modulated data signal with the shifted pseudo-noise code, generating a correlation signal, and comparing the correlation signal with the predetermined value until comparing determines that the demodulated signal is temporally synchronized.

19. The method according to claim 18, wherein if all shifted versions of the pseudo-noise code are used and comparing determines that the demodulated signal is not synchronized, outputting an error signal.

20. The method according to claim 18 wherein a new portion of the received data signal is used during demodulating with each shifted version of the pseudo-noise code.

* * * * *

UNITED STATES PATENT AND TRADEMARK OFFICE
CERTIFICATE OF CORRECTION

| | | |
|---|---|---|
| PATENT NO. | : 7,933,315 B2 | Page 1 of 1 |
| APPLICATION NO. | : 11/504270 | |
| DATED | : April 26, 2011 | |
| INVENTOR(S) | : Li et al. | |

It is certified that error appears in the above-identified patent and that said Letters Patent is hereby corrected as shown below:

In Col. 9, line 8
replace "pseudo-nouse"
with --pseudo noise--

In Col. 9, line 9
replace "al"
with --at--

In Col. 9, line 12
replace "the the"
with --the--

Signed and Sealed this
Twelfth Day of July, 2011

David J. Kappos
*Director of the United States Patent and Trademark Office*